US012809471B2

(12) United States Patent
Okuhara

(10) Patent No.: US 12,809,471 B2
(45) Date of Patent: Nov. 24, 2026

(54) COMMUNICATION APPARATUS AND METHOD EXECUTED BY COMMUNICATION APPARATUS

(71) Applicant: CANON KABUSHIKI KAISHA, Tokyo (JP)

(72) Inventor: Ryusuke Okuhara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 203 days.

(21) Appl. No.: 18/934,856

(22) Filed: Nov. 1, 2024

(65) Prior Publication Data

US 2025/0156177 A1 May 15, 2025

(30) Foreign Application Priority Data

Nov. 10, 2023 (JP) ................................ 2023-192352

(51) Int. Cl.
*G06F 8/65* (2018.01)
*G06F 3/02* (2006.01)
*G06F 8/654* (2018.01)

(52) U.S. Cl.
CPC .............. *G06F 3/0227* (2013.01); *G06F 8/65* (2013.01); *G06F 8/654* (2018.02)

(58) Field of Classification Search
CPC .................................................... G06F 3/0227
See application file for complete search history.

(56) References Cited

U.S. PATENT DOCUMENTS

2011/0029692 A1* 2/2011 Chassot ................ G06F 3/0227 710/14

FOREIGN PATENT DOCUMENTS

JP 2018022361 A 2/2018

OTHER PUBLICATIONS

Nelson et al., CA 2798893, Jun. 21, 2013, 73 pgs <CA_2798893.pdf>.*
Sun, Si-xiang, CN 112631531 (translation) Apr. 9, 2021, 11 pgs <CN_112631531.pdf>.*
Nakajima Makoto, JP 2004185518 (translation) Jul. 2, 2004, 18 pgs <JP_2004185518.pdf>.*

* cited by examiner

*Primary Examiner* — Tuan A Vu
(74) *Attorney, Agent, or Firm* — Cowan, Liebowitz & Latman, P.C.

(57) ABSTRACT

A communication apparatus that includes a communication interface and provides a function pertaining to firmware update of an electronic device which can be communicated with through the communication interface is disclosed. The apparatus obtains information on firmware currently installed in the electronic device and transmits latest firmware to the electronic device in a case where the installed firmware is not the latest firmware. The apparatus terminates or maintains a connection with the electronic device once the latest firmware finishes being transmitted depending on the number and/or type of input device(s) included in the electronic device.

10 Claims, 12 Drawing Sheets

COMMUNICATION APPARATUS AND METHOD EXECUTED BY COMMUNICATION APPARATUS

BACKGROUND OF THE INVENTION

Field of the Invention

The present invention relates to a communication apparatus and a method executed by the communication apparatus, and particularly relates to a communication apparatus capable of transmitting an update program to an external device and a method executed by the communication apparatus.

Description of the Related Art

Japanese Patent Laid-Open No. 2018-22361 discloses a client terminal that obtains firmware of an image capture apparatus from a server apparatus and updates the firmware of the image capture apparatus upon becoming capable of communicating with the image capture apparatus.

Firmware is software that directly affects the operations of an apparatus or a device, and it is therefore desirable to obtain confirmation from a user before performing the update. In particular, when the same client terminal is capable of updating the firmware of different types of devices, it is necessary to ensure the user recognizes for which device the firmware will be updated. However, Japanese Patent Laid-Open No. 2018-22361 assumes an update for a single model, and does not provide a way for the user to recognize for which device the firmware will be updated.

SUMMARY OF THE INVENTION

In light of such problems with the conventional techniques, one aspect of the present invention provides a communication apparatus which is capable of transmitting firmware for a plurality of types of electronic devices, and which is capable of suppressing firmware updates for unintended devices.

According to an aspect of the present invention, there is provided a communication apparatus comprising: a communication interface; and one or more processors that execute a program stored in a memory and thereby function as a control unit that provides a function pertaining to firmware update of an electronic device which can be communicated with through the communication interface, wherein the control unit: obtains information on firmware currently installed in the electronic device; transmits latest firmware to the electronic device in a case where the installed firmware is not the latest firmware; terminates a connection with the electronic device once the latest firmware finishes being transmitted, in a case where the electronic device is a first type of electronic device including (i) at least two independent input devices or (ii) an input device capable of providing two or more independent input regions; and maintains the connection after the latest firmware finishes being transmitted, until the firmware update of the electronic device is executed or canceled, in a case where the electronic device is a second type of electronic device including a single physical key, button, or switch as an input device.

According to another aspect of the present invention, there is provided a method executed by a communication apparatus having a communication interface, the method comprising: obtaining information on firmware currently installed in an electronic device which can be communicated with through the communication interface; transmitting latest firmware to the electronic device in a case where the installed firmware is not the latest firmware; terminating a connection with the electronic device once the latest firmware finishes being transmitted, in a case where the electronic device is a first type of electronic device including (i) at least two independent input devices or (ii) an input device capable of providing two independent input regions; and maintaining the connection after the latest firmware finishes being transmitted, until the firmware update of the electronic device is executed or canceled, in a case where the electronic device is a second type of electronic device including a single physical key, button, or switch as an input device.

According to a further aspect of the present invention, there is provided a non-transitory computer-readable medium storing a program that causes, when executed by a computer comprising a communication interface, the computer to perform a method comprising: obtaining information on firmware currently installed in an electronic device which can be communicated with through the communication interface; transmitting latest firmware to the electronic device in a case where the installed firmware is not the latest firmware; terminating a connection with the electronic device once the latest firmware finishes being transmitted, in a case where the electronic device is a first type of electronic device including (i) at least two independent input devices or (ii) an input device capable of providing two independent input regions; and maintaining the connection after the latest firmware finishes being transmitted, until the firmware update of the electronic device is executed or canceled, in a case where the electronic device is a second type of electronic device including a single physical key, button, or switch as an input device.

Further features of the present invention will become apparent from the following description of exemplary embodiments (with reference to the attached drawings).

DESCRIPTION OF THE EMBODIMENTS

Figure 1A:
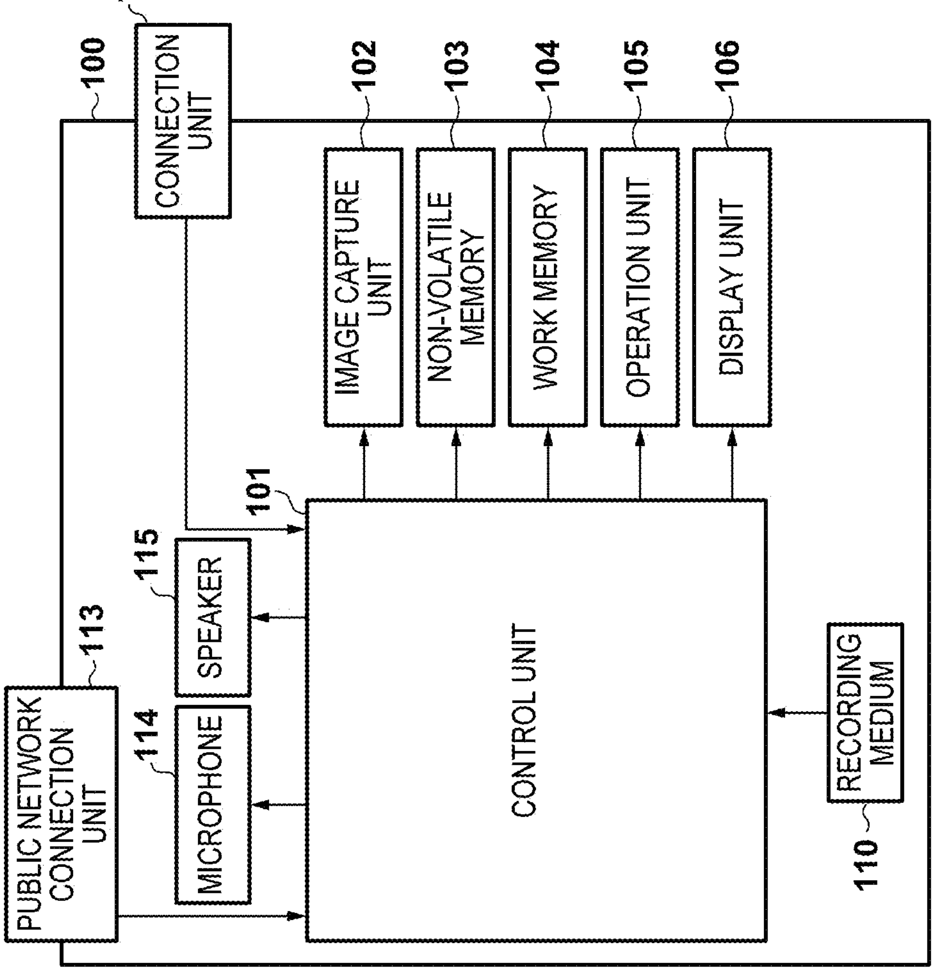
FIGS. 1A and 1B are diagrams illustrating a mobile device serving as an example of a communication apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the configurations illustrated in the drawings as blocks may be realized by an integrated circuit (IC) such as an ASIC or an FPGA, by a discrete circuit, or by a combination of a memory and a processor executing a program stored in the memory. In addition, a single block may be realized by a plurality of integrated circuit packages, or a plurality of blocks may be realized by a single integrated circuit package. Additionally, the same block may be implemented in different configurations in accordance with the operating environment, required capabilities, or the like.

The following embodiment will describe a case where the present invention is applied in a small computer device (mobile device) such as a smartphone or a tablet. However, the present invention can be applied in a general information processing apparatus having a communication function, such as a personal computer (laptop or desktop type), a media player, a PDA, a game console, or the like.

Mobile Device Configuration

Figure 1B:
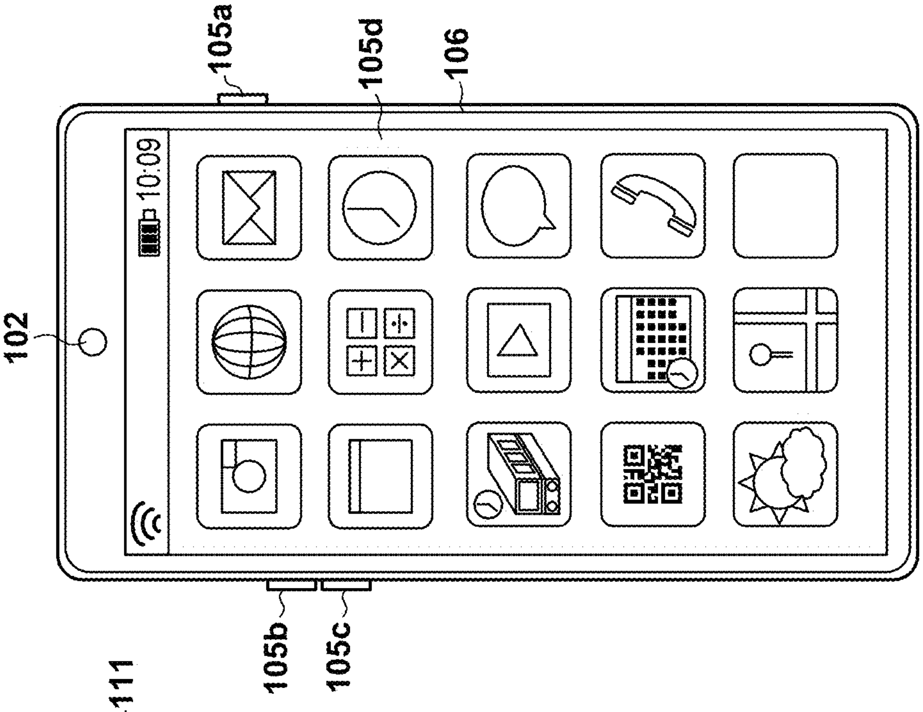

FIG. 1A is a block diagram illustrating an example of the functional configuration of a mobile device 100, which is an example of a communication apparatus according to the embodiment, and FIG. 1B is a diagram illustrating an example of the external appearance of the mobile device 100.

A control unit 101 is one or more processors ("CPUs" hereinafter) capable of executing programs. The control unit 101 controls the operations of the mobile device 100 by loading programs stored in a non-volatile memory 103 or a recording medium 110 into a work memory 104 and executing the programs. The programs executed by the control unit 101 include a BIOS, basic software (an OS), application programs running on the OS, and the like. Note that some of the processing executed by the control unit 101 may be handled by other hardware.

An image capture unit 102 includes a lens and an image sensor. The image sensor may be a CCD or CMOS color image sensor having, for example, a primary color Bayer array color filter. The image sensor includes a pixel array, in which a plurality of pixels are arranged two-dimensionally, and peripheral circuitry for reading out signals from the pixels. Each pixel accumulates a charge corresponding to an amount of incident light through photoelectric conversion. By reading out, from each pixel, a signal having a voltage corresponding to the charge amount accumulated during an exposure period, a group of pixel signals (analog image signals) representing an optical image formed by the lens is obtained. The image capture unit 102 applies noise reduction processing, A/D conversion processing, and the like to the analog image signals, and outputs a digital image signal (image data).

The image data is temporarily stored in the work memory 104. The control unit 101 applies processing to the image data according to the purpose thereof. The purpose may be display, recording, or output to the exterior, for example. Image data to which the processing for recording has been applied is stored in a data file of a predetermined format and recorded in the recording medium 110.

Note that in addition to being recorded in the recording medium 110, the image data may be transmitted to the exterior through a communication interface such as a public network connection unit 113 or a connection unit 111. The transmission destination may be a connected external device, or may be a server that provides an online storage service, a social networking service, or the like. The transmission of image data to the exterior may be performed automatically.

The non-volatile memory 103 is electrically rewritable. Various programs executed by the control unit 101, GUI data, setting values for the mobile device 100 and application programs, and the like are stored in the non-volatile memory 103. A print control application program (print application), which will be described later, is also stored in the non-volatile memory 103. The print application provides functions such as various types of print processing, firmware update processing, and the like for a plurality of types of printers capable of communicating with the mobile device 100.

Note that the print application may be stored in the recording medium 110 instead of the non-volatile memory 103. The operations of the mobile device 100 with respect to firmware updates, which will be described below, are implemented by the control unit 101 executing the print application. Note also that the functions implemented by the print application may be realized by the print application alone, or may be implemented by the print application using functions provided by the OS.

The work memory 104 is a RAM, and is used by the control unit 101 to load programs, hold information necessary for executing the programs, the like. The work memory 104 is also used as a buffer memory for temporarily storing various types of data, and as a video memory for a display unit 106. Additionally, a firmware file downloaded from a server on an external network through the connection unit 111 or the public network connection unit 113 is stored in the work memory 104 before being transmitted to the device to be updated. Note, however, that the firmware file may be stored in the non-volatile memory 103 or the recording medium 110.

"Operation unit 105" is a collective name for input devices provided in the mobile device 100. The input devices can include, for example, a power button 105*a*, volume buttons 105*b* and 105*c*, a touch panel 105*d*, and the like, as illustrated in FIG. 1B. Mobile devices are typically provided with a plurality of such input devices.

The display unit 106 is a touchscreen, and is used for displaying image data, text for interactive operations, icons for making various operations in applications, and the like. Note that the display unit 106 may be a device external to the mobile device 100. It is sufficient for the mobile device 100 to have at least a function for controlling displays made in the display unit 106.

The recording medium 110 is a semiconductor memory card, for example, and is used as a recording destination for image data obtained by the image capture unit 102, a storage destination for application programs, and the like. The mobile device 100 has means for reading and writing data from and to the recording medium 110, and the form of the recording medium 110 is therefore not limited. The non-volatile memory 103 and the recording medium 110 need not necessarily be configured as independent pieces of hardware, and the non-volatile memory 103 may have the functions of the recording medium 110 described in the present embodiment.

The connection unit 111 is a communication interface for communicating with an external device over wires or wirelessly. In the present embodiment, the mobile device 100 communicates with the external device for which the firmware is to be updated through the connection unit 111. The connection unit 111 is compliant with one or more communication standards. The present embodiment assumes that the connection unit 111 is compliant with a wireless LAN standard, but the connection unit 111 may be compliant with one or more other standards such as USB, Bluetooth (registered trademark), and the like. Note that the mobile device 100 may communicate with a device on the external network through an external access point with which the connection unit 111 is capable of communicating.

The public network connection unit 113 is a wireless communication interface with what is known as a mobile communication network, such as 3G, 4G, 5G, or the like. The mobile device 100 can make voice calls, transmit and receive data, and the like with external devices through the public network connection unit 113. When making voice calls, the control unit 101 inputs and outputs audio signals through a microphone 114 and a speaker 115. The present embodiment assumes that the mobile device 100 communicates with the server that provides firmware through the public network connection unit 113. Note that the connection unit 111 and the public network connection unit 113 may share at least some elements, such as an antenna.

Configuration of Printer 200

Figure 2B:
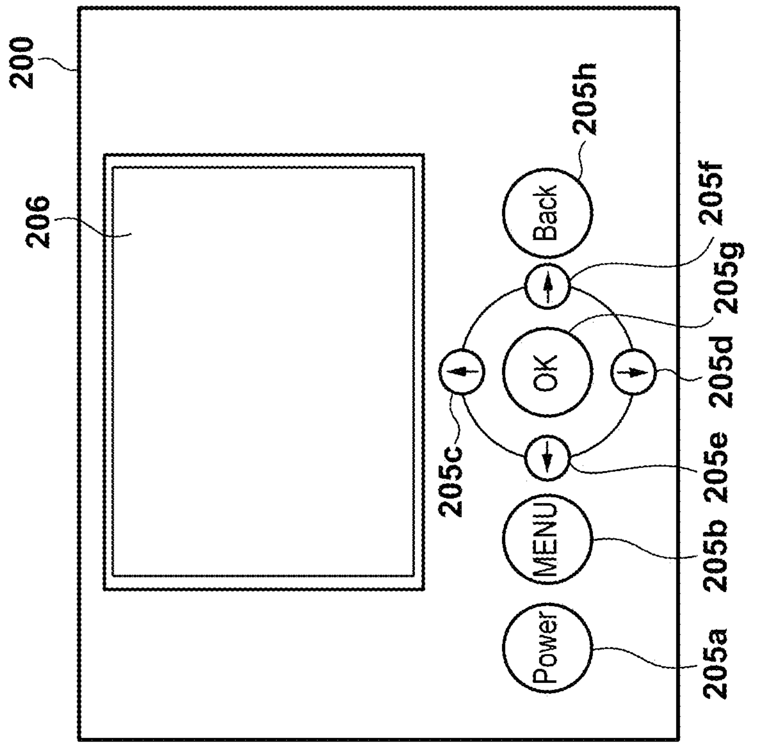
FIGS. 2A and 2B are diagrams illustrating a printer serving as an electronic device of a type A according to the embodiment.
Figure 2A:
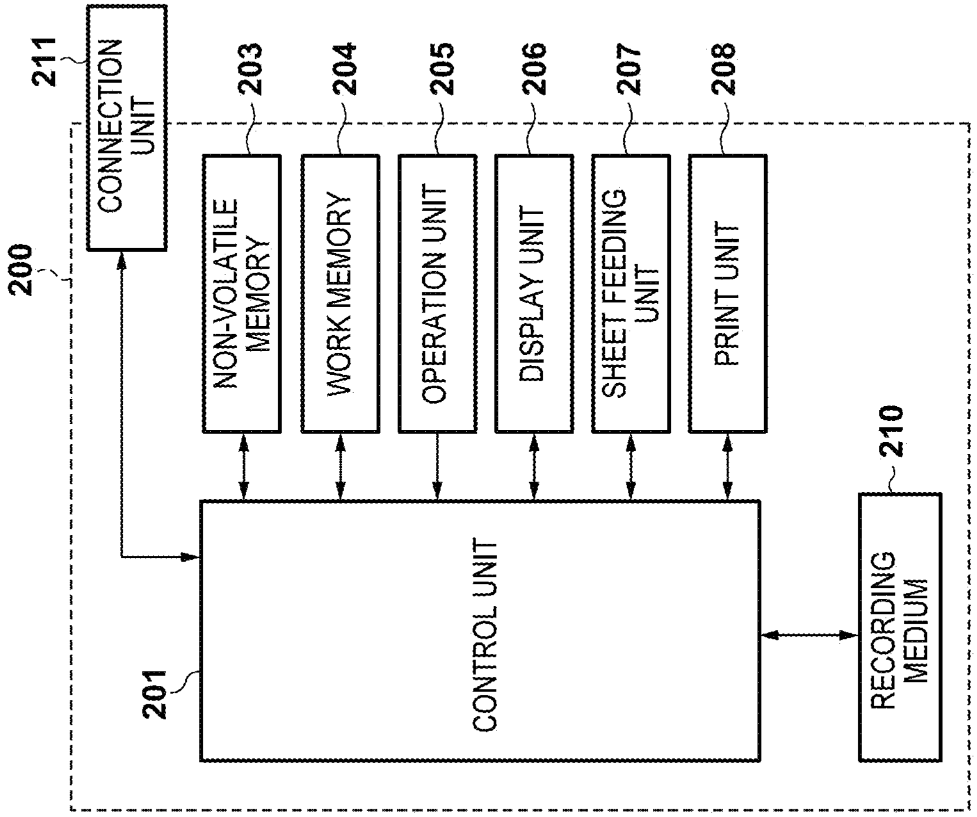

A printer 200 serving as an example of an external device for which firmware is to be updated in the present embodiment will be described next with reference to FIGS. 2A and 2B. The printer 200 includes a flat-panel display and a plurality of input devices. A printer including two or more independent input devices, or a printer including an input device capable of providing two or more independent input regions, will also be called a "type A" (first type) printer. An input device capable of providing two or more independent input regions is, for example, a touchscreen capable of providing two or more independent software keys. Note that the printer 200 is assumed to be a color ink jet printer.

A control unit 201 is one or more processors ("CPUs" hereinafter) capable of executing programs. The control unit 201 controls the operations of the printer 200 by loading programs (firmware) stored in a non-volatile memory 203 or a recording medium 210 into a work memory 204 and executing the programs. Note that some of the processing executed by the control unit 201 may be handled by other hardware.

The non-volatile memory 203 is electrically rewritable. Firmware executed by the control unit 201, setting values of the printer 200, and the like are stored in the non-volatile memory 203.

The work memory 204 is a RAM, and is used by the control unit 201 to load programs, hold information necessary for executing the programs, the like. The work memory 204 is also used as a buffer memory for temporarily storing various types of data, such as firmware received from the mobile device 100. The work memory 204 is further used as a video memory for a display unit 206.

"Operation unit 205" is a collective name for input devices provided in the housing of the printer 200. The input devices can include, for example, a power button 205*a*, a menu button 205*b*, four-direction buttons 205*c* to 205*f*, an OK button 205*g*, a back button 205*h*, and the like, as illustrated in FIG. 2B, for example. For example, the user can use the four-direction buttons 205*c* to 205*f* to select menu items displayed in the display unit 206 in response to the menu button 205*b* being pressed. Then, the user can instruct the selected item to be executed by pressing the OK button 205*g*. The user can return to the previous display state by pressing the back button 205*h*. Note that the functions assigned to the buttons may change dynamically as well.

The display unit 206 is a flat-panel display such as an LCD panel. The display unit 206 may be a color display or a black-and-white display. If a color display, the display unit 206 can display image data stored in the recording medium 210, for example. The display unit 206 is also used to display various types of images and text, such as menu screens, error display screens, guidance screens, and the like. Note that the display unit 206 may be a device external to the printer 200. It is sufficient for the printer 200 to have at least a function for controlling displays made in the display unit 206.

A sheet feeding unit 207 conveys sheet-shaped recording paper from a sheet feed tray to a discharge tray along a predetermined conveyance path. Note that it is also possible to convey media other than paper, media of different sizes, and the like.

A print unit 208 is disposed in the vicinity of the conveyance path, and forms images on the recording paper using a print head. Although the print unit 208 is assumed here to an ink jet type, the unit may be another type, such as an electrophotographic type.

The recording medium 210 is, for example, a detachable semiconductor memory card. The printer 200 forms images based on data stored in the recording medium 210 or data received through a connection unit 211.

The connection unit 211 is a communication interface for communicating with an external device over wires or wirelessly. In the present embodiment, the printer 200 communicates with the mobile device 100 through the connection unit 211. The connection unit 211 is compliant with one or more communication standards. The present embodiment assumes that the connection unit 211 is compliant with a wireless LAN standard, but the connection unit 211 may be compliant with one or more other standards such as USB, Bluetooth (registered trademark), and the like.

In the present embodiment, the printer 200 (the connection unit 211) can operate as an access point (AP) in infrastructure mode according to the wireless LAN standard. However, the printer 200 is assumed to operate as a simple AP which does not have a gateway function for transferring receive data to another network. However, the printer 200 (the connection unit 211) may be configured to be capable of operating as an AP having a gateway function.

An external device having a connection unit compliant with a wireless LAN standard can communicate with the printer 200 by joining a network generated by the printer 200 (the connection unit 211). It is assumed that information necessary for joining the network formed by the printer 200 (the connection unit 211) (e.g., an SSID and a password) is already registered in the mobile device 100.

Configuration of Printer 300

Figure 3B:
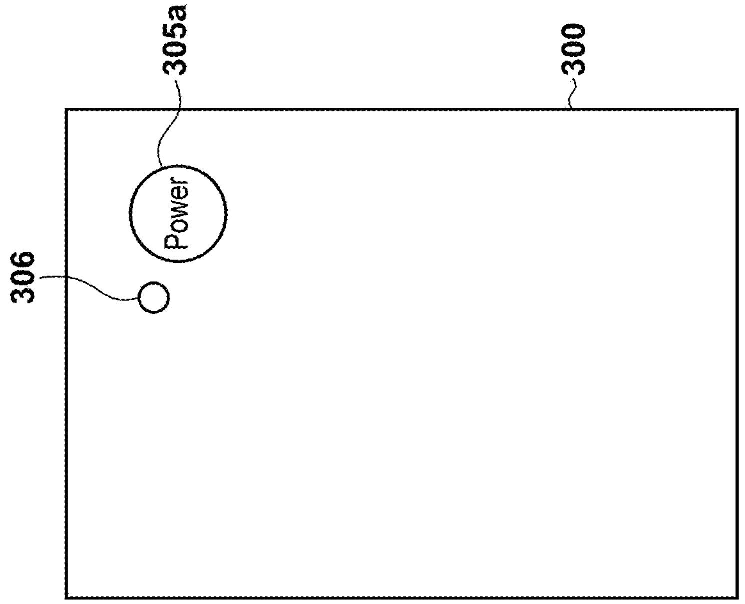
FIGS. 3A and 3B are diagrams illustrating a printer serving as an electronic device of a type B according to the embodiment.
Figure 3A:
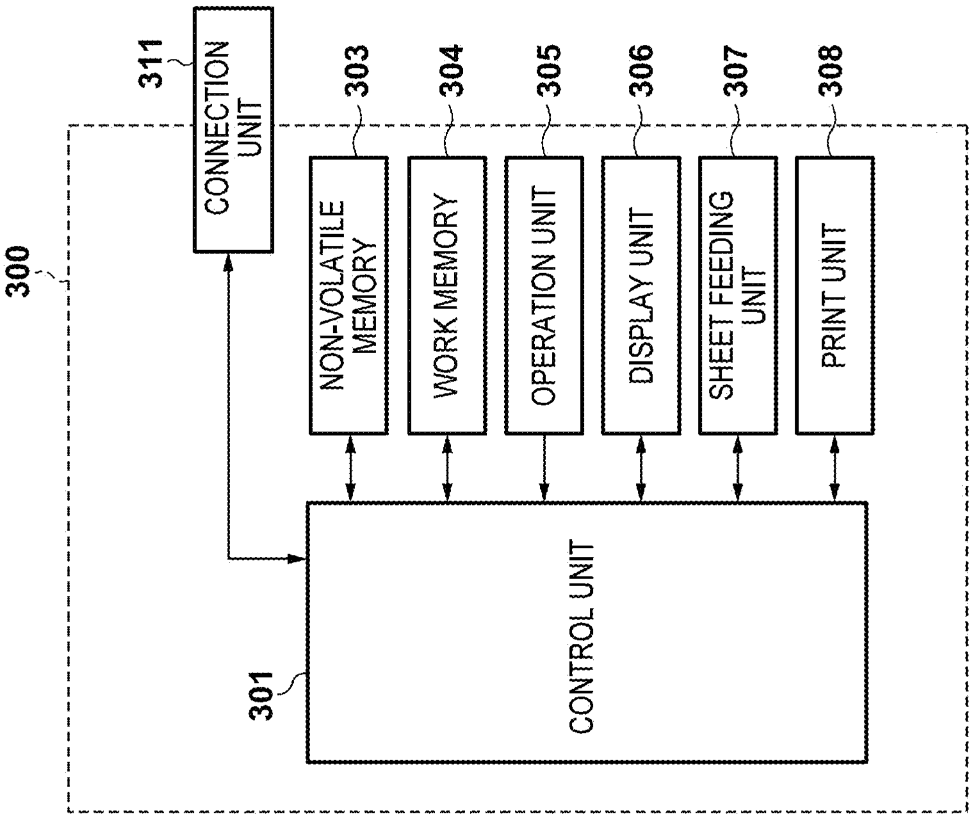

A printer 300 serving as an another example of an external device for which firmware is to be updated in the present embodiment will be described next with reference to FIGS. 3A and 3B. The printer 300 is a printer which does not include a flat-panel display, and which includes only a single physical key, button, or switch as an input device, and will also be called a type B printer hereinafter. The printer 300 is also assumed to be a compact thermal-type printer.

The function blocks of the printer 300 are assumed to have basically the same functions as the function blocks of the same name in the printer 200, and thus only the differences will be described hereinafter.

An operation unit 305 is constituted by a single input device (a power button 305*a* for turning the power of the printer 300 on and off).

A display unit 306 is an indicator, such as an LED, which changes between two states, namely on or off; alternatively, the color thereof may change as well. A plurality of display unit 306 may be provided, but are assumed not to have functions for displaying text, images, and the like.

Figure 9A:
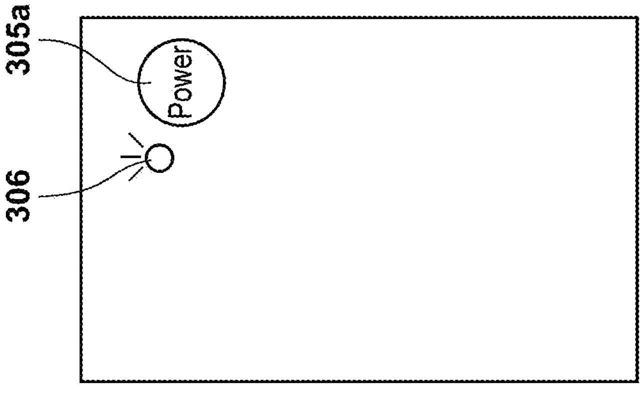
FIGS. 9A to 9D are schematic diagrams illustrating lighting patterns of an indicator in a printer of the type B according to the embodiment.
Figure 9B:
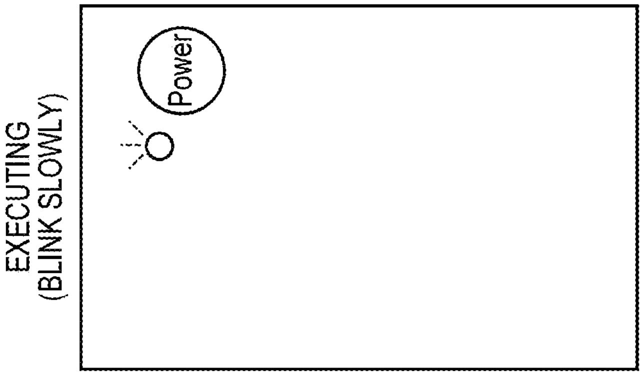
Figure 9C:
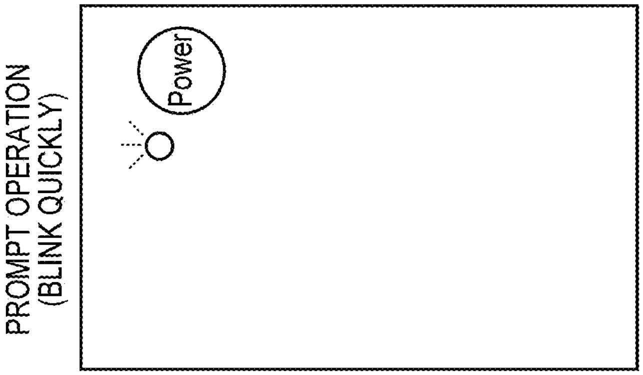

For example, the display unit 306 turns off when the printer 300 is powered off, and turns on when the power button 305*a* is manipulated to power the printer 300 on. The display unit 306 blinks slowly during predetermined operations, such as when the printer 300 is exchanging data with an external device (e.g., mobile device 100) through a connection unit 311, during printing, during a firmware update, and the like (FIG. 9B). The display unit 306 blinks quickly when prompting the user to operate the printer 300, notifying the user of a warning or an error, or the like (FIG. 9C).

The printer 300 does not have a recording medium, and therefore prints based on data received from an external device through the connection unit 311. A print unit 308 forms an image on recording paper by applying heat to the recording paper or to an ink ribbon.

Overview of Firmware Update System

Figure 4:
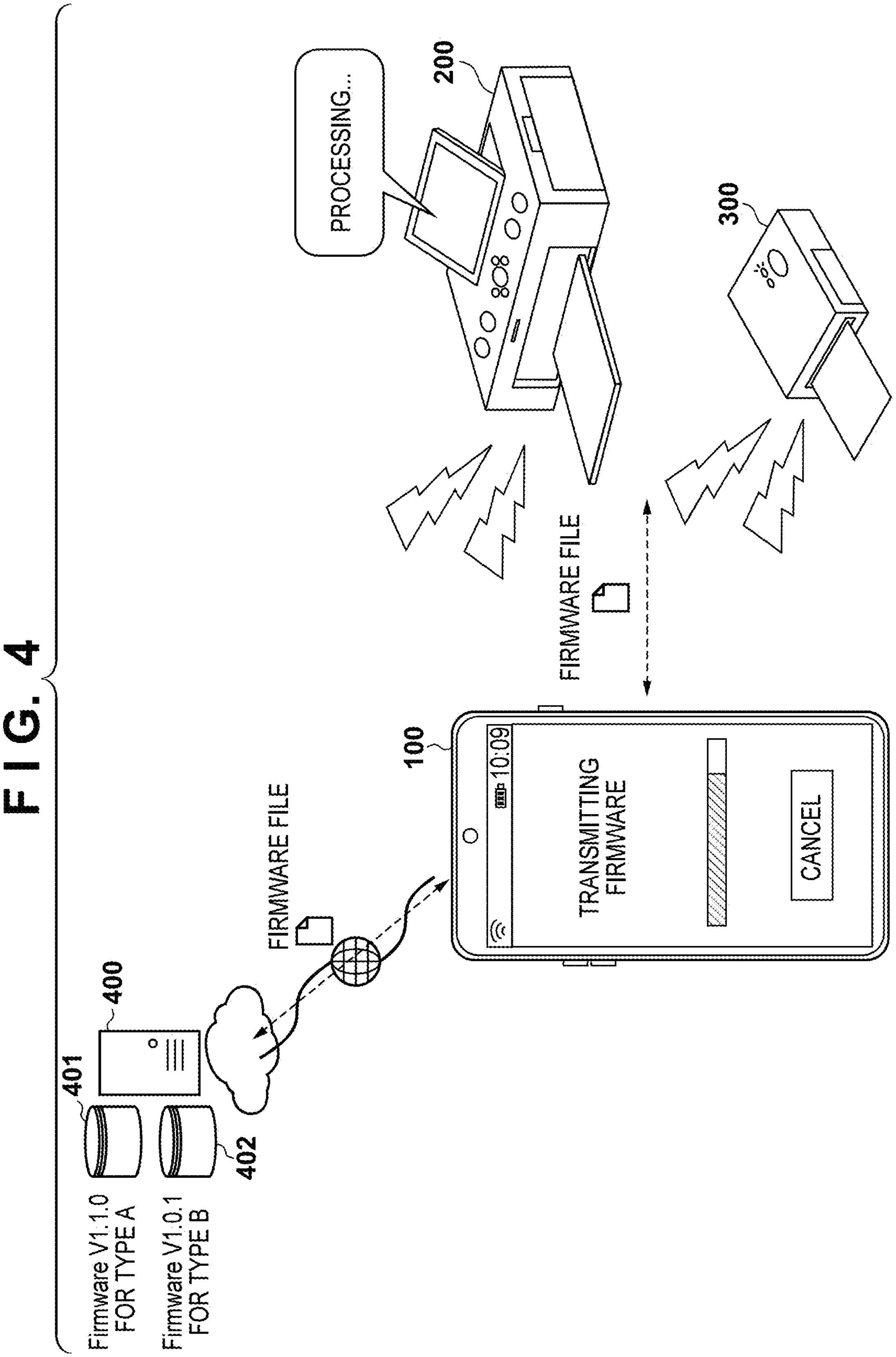
FIG. 4 is a schematic diagram illustrating firmware update processing using the mobile device according to the embodiment.

FIG. 4 is a schematic diagram illustrating firmware update operations performed for the printer 200 and the printer 300 using the mobile device 100. When the print application is launched in the mobile device 100, the control unit 101 displays a printer selection screen, such as that illustrated in FIG. 5A, for example, in the display unit 106. It is assumed here that the printers 200 and 300 are registered in the print application in advance.

The printer selection screen includes a button 501 for selecting the printer 200, and a button 502 for selecting the printer 300. The display unit 106 is a touchscreen which includes the touch panel 105*d*. Accordingly, upon detecting the button 501 or 502 being touched, the control unit 101 recognizes that the printer corresponding to the touched button has been selected.

The control unit 101 then communicates with the selected printer through the connection unit 111, obtains the version of the firmware of the printer, and stores that version in the work memory 104. Then, the control unit 101 communicates with a predetermined server device 400 through the public network connection unit 113, and obtains the latest version of the firmware for the selected printer. The control unit 101 compares the version of the firmware of the printer stored in the work memory 104 with the latest firmware version obtained. If the version of the firmware of the printer is older than the latest firmware version, the control unit 101 displays an inquiry screen, illustrated in FIG. 5C, for example, in the display unit 106.

Figure 5A:
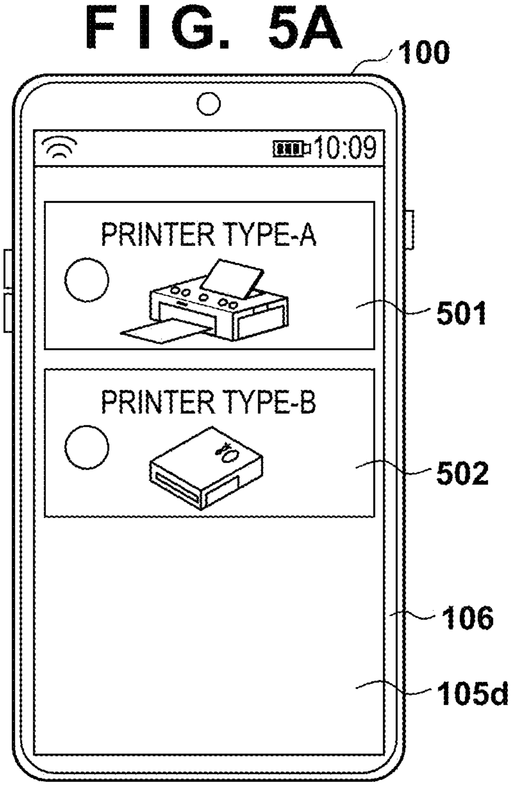
FIGS. 5A to 5G are diagrams illustrating examples of display screens in the mobile device according to the embodiment.

The inquiry screen includes a message indicating that the firmware update is available, and buttons 503 and 504 for the user to instruct whether or not to update the firmware. Upon detecting that the button 503 for instructing the firmware to be updated has been touched, the control unit 101 downloads the firmware file from the server device 400. The control unit 101 displays a progress screen, such as that illustrated in FIG. 5D, in the display unit 106 while the firmware file is downloading.

The firmware file is stored in the work memory 104, for example. Once the download of the firmware file is complete, the control unit 101 transmits the firmware file to the target printer through the connection unit 111. The control unit 101 displays a progress screen, such as that illustrated in FIG. 5E, in the display unit 106 while the firmware file is being transmitted. Note that if the communication with the printer is cut off after the firmware version is obtained from the printer, the control unit 101 transmits the firmware file after reestablishing communication with the printer.

Figure 5B:
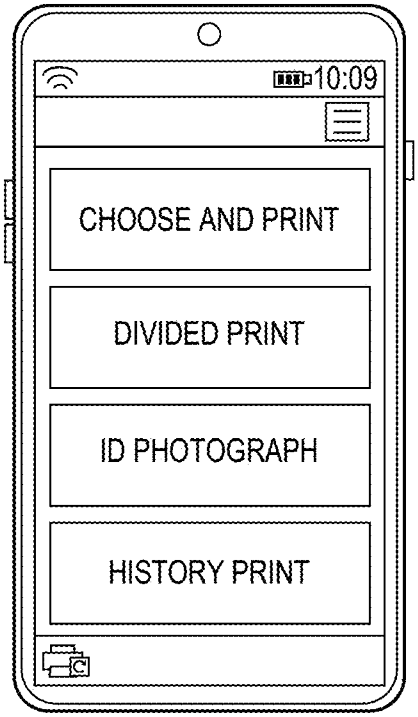

If the button 504 instructing the firmware not to be updated is pressed in the inquiry screen, the control unit 101 skips obtaining the firmware file from the server device 400, and displays an operation menu screen, such as that illustrated in FIG. 5B, in the display unit 106. The operation menu screen is a screen for selecting operations to be performed by the printer selected in the selection screen illustrated in FIG. 5A. The operation menu screen includes buttons corresponding to operations. The control unit 101 transitions to the operations corresponding to the button that is pressed. Operations performed by the printer through the operation menu screen are unrelated to the present embodiment, and thus further details thereof will be omitted.

Once the transmission of the firmware file to the printer is complete, the control unit 101 performs different processing depending on whether a type A printer or a type B printer has been selected. This will be described in detail later. In either case, the firmware update is executed after obtaining a final confirmation from the user as to whether to update the firmware, made through the operation unit of the printer.

Operations performed by the mobile device 100 when the printer for which the firmware is to be updated is the type A printer 200, and when the printer is the type B printer 300, will be described next in order. Whether the printer registered in the print application is a type A printer or a type B printer is assumed to be set during registration. Information (a table) associating model names with types is stored in the non-volatile memory 103 in advance, and the control unit 101 can identify the type of the printer by referring to the table using a model name obtained by communicating with the printer during registration, for example. Note that this is merely one example, and the type of the printer may be identified using another method, such as the printer notifying the mobile device 100 of the type as part of the printer's own information.

Firmware Update Sequence for Type A Printer

Figure 6:
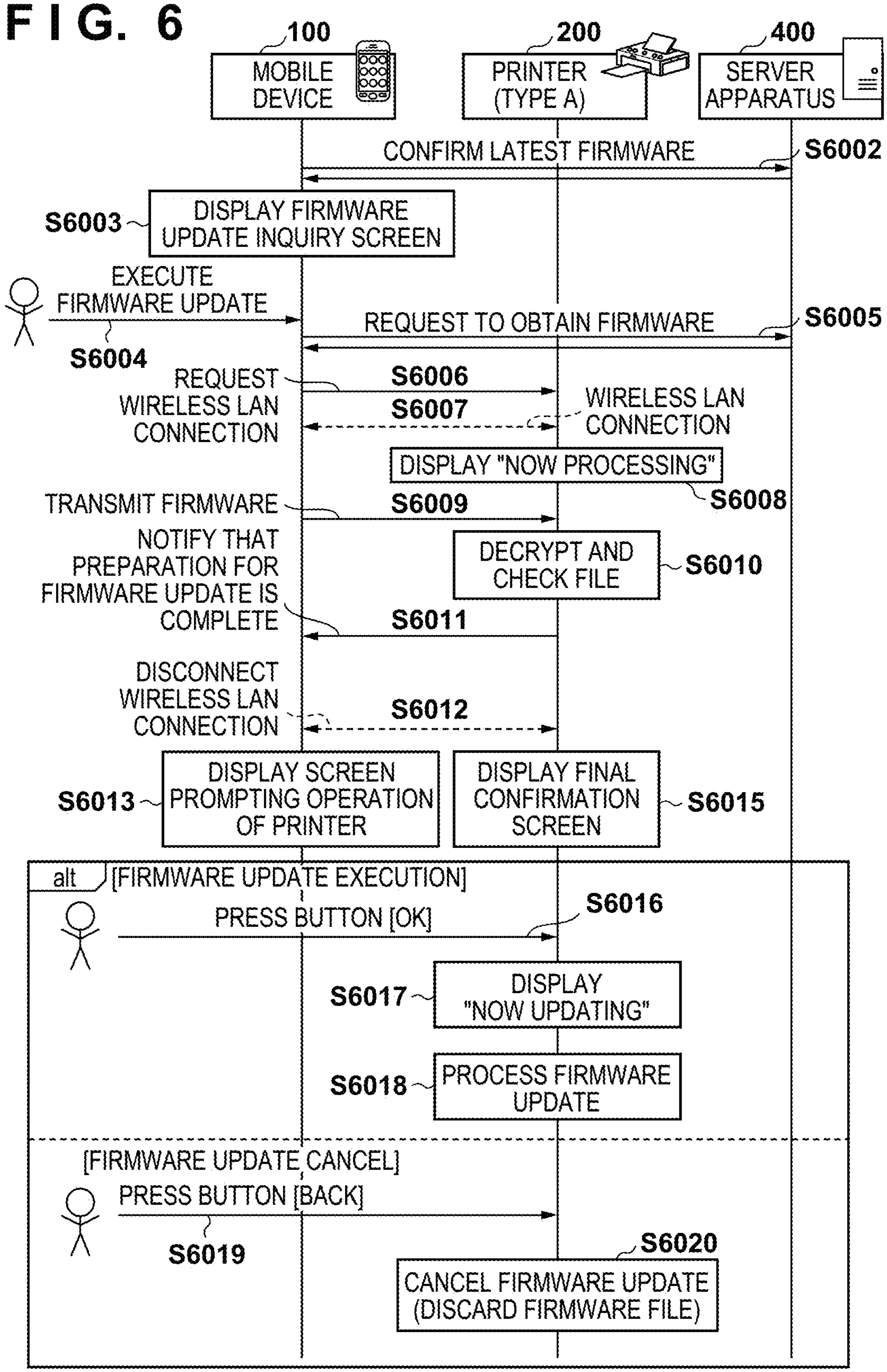
FIG. 6 is a sequence chart illustrating firmware update processing for a printer of the type A according to the embodiment.
Figure 7A:
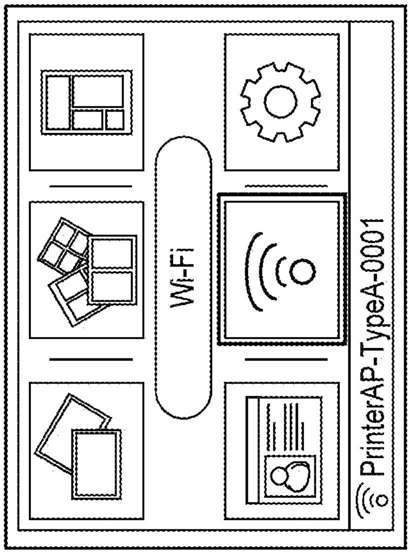
FIGS. 7A to 7D are diagrams illustrating examples of display screens for a printer of the type A according to the embodiment.
Figure 7B:
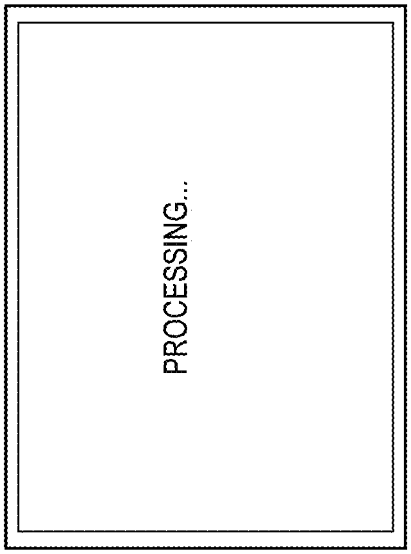

First, a case where the printer for which the firmware is to be updated is the type A printer 200 will be described with reference to the sequence chart in FIG. 6. FIG. 6 illustrates a sequence of operations performed after the printer 200 is selected in the printer selection screen illustrated in FIG. 5A and the mobile device 100 has confirmed the firmware version of the printer 200. It is assumed that the connection unit 211 is set to "active" in the printer 200 through a menu screen, such as that illustrated in FIG. 7A, displayed in the display unit 206, and that the printer 200 has formed a network as a simple AP.

In step S6002, the control unit 101 communicates with the server device 400 through the public network connection unit 113 and obtains the latest firmware version number for the printer 200. The control unit 101 determines whether the firmware version number obtained from the printer 200 earlier is older than the latest firmware version number. Assume here that the firmware version number obtained from the printer 200 is determined to be older than the latest firmware version number. In this case, in step S6003, the control unit 101 displays an inquiry screen, such as that illustrated in FIG. 5C, in the display unit 106.

Assume that in step S6004, the user instructs the firmware update to be executed through the inquiry screen.

In step S6005, the control unit 101 downloads the file of the latest firmware for the printer 200 from the server device 400 through the public network connection unit 113. Once the download is complete, in step S6006, the control unit 101 of the mobile device 100 transmits a request to connect to the network formed by the printer 200 through the connection unit 111. As described above, information for connecting to the network formed by the printer 200 is assumed to be registered in the non-volatile memory 103 in advance.

In step S6007, a connection is established between the connection unit 111 of the mobile device 100 and the connection unit 211 of the printer 200.

In step S6008, in response to communication with the mobile device 100 being established, the control unit 201 of the printer 200 displays a "now processing" screen, such as that illustrated in FIG. 8B, in the display unit 206.

In step S6009, the control unit 101 of the mobile device 100 transmits the latest firmware file, downloaded from the server device 400, to the printer 200. Upon receiving the firmware file from the mobile device 100 through the connection unit 211, the control unit 201 of the printer 200 stores the file in the work memory 204, for example.

In step S6010, the control unit 201 confirms the authenticity of the firmware data by decrypting the firmware file or the like as necessary.

If the authenticity of the received firmware data has been successfully confirmed, in step S6011, the control unit 201 notifies the mobile device 100 that preparation for the firmware update is complete through the connection unit 211.

Upon receiving the notification from the printer 200 that the preparation for the firmware update is complete through the connection unit 111, in step S6012, the control unit 101 disconnects from the printer 200.

Figure 5C:
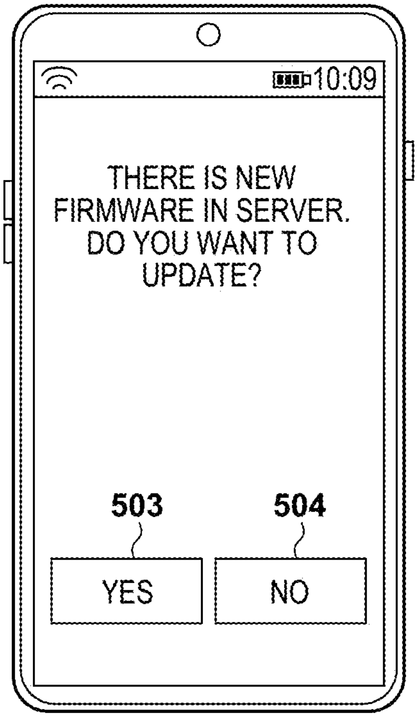
Figure 5D:
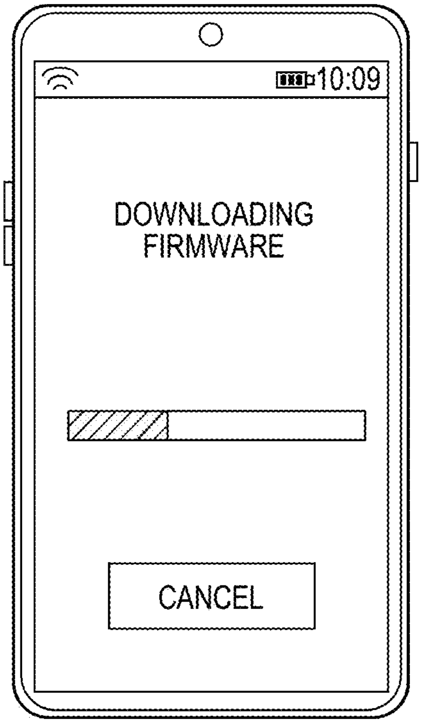
Figure 5E:
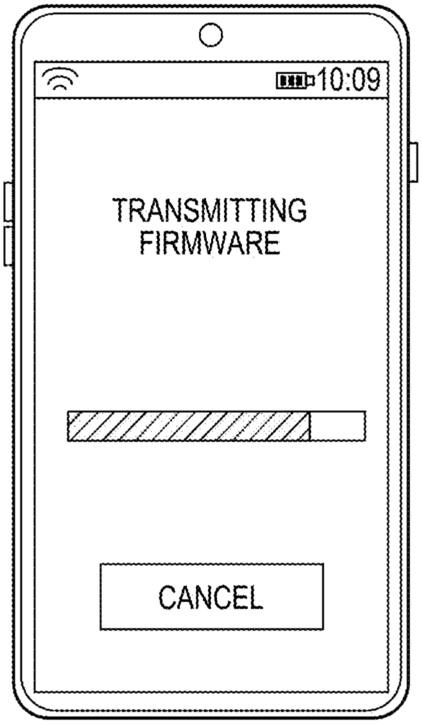
Figure 5F:
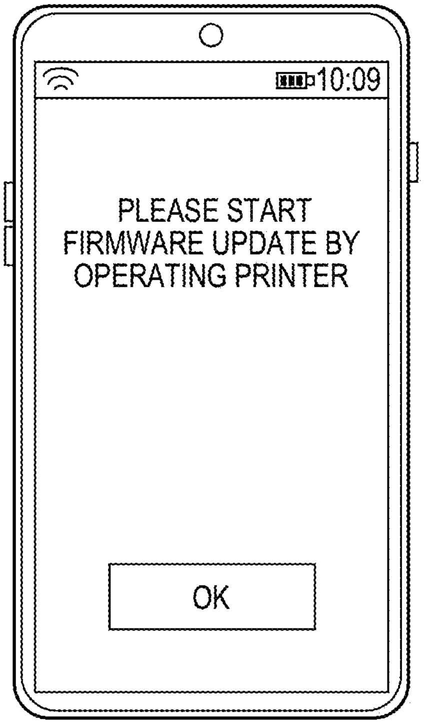

Then, in step S6013, the control unit 101 displays, in the display unit 106, a message screen prompting the user to operate the printer to execute the firmware update, as illustrated in FIG. 5F.

Although an instruction to update the firmware for the printer 200 has been obtained from the user through the inquiry screen (FIG. 5C), the user may have selected the wrong printer in the selection screen (FIG. 5A). Causing the user to operate the printer for which the firmware is to be updated and perform a final confirmation for the firmware update makes it possible to avoid updating the firmware for a printer not intended by the user.

Figure 7C:
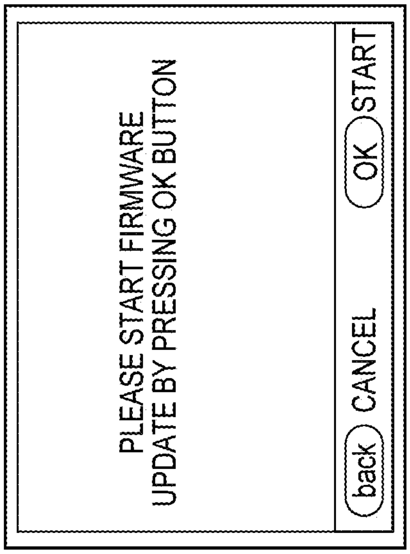

In step S6015, the control unit 201 of the printer 200 displays, in the display unit 206, a final confirmation screen for the firmware update, such as that illustrated in FIG. 7C. The final confirmation screen includes an OK button for instructing the firmware update to be executed and a Back button for stopping (canceling) the firmware update. Note that the OK button and the Back button may be displayed as software buttons, or may be displayed as functions assigned to physical keys.

Figure 7D:

When the OK button is pressed in step S6016, in step S6017, the control unit 201 displays a "now firmware updating" screen, such as that illustrated in FIG. 7D, in the display unit 206. Then, in step S6018, the control unit 201 updates the firmware data stored in the non-volatile memory 203 using the latest firmware data stored in the work memory 104. Once the update processing ends, the control unit 201 restarts the printer 200.

On the other hand, if the Back button is operated in step S6017, in step S6020, the control unit 201 cancels the firmware update. In this case, the control unit 201 discards the firmware file received from the mobile device 100.

Firmware Update Sequence for Type B Printer

Figure 8:
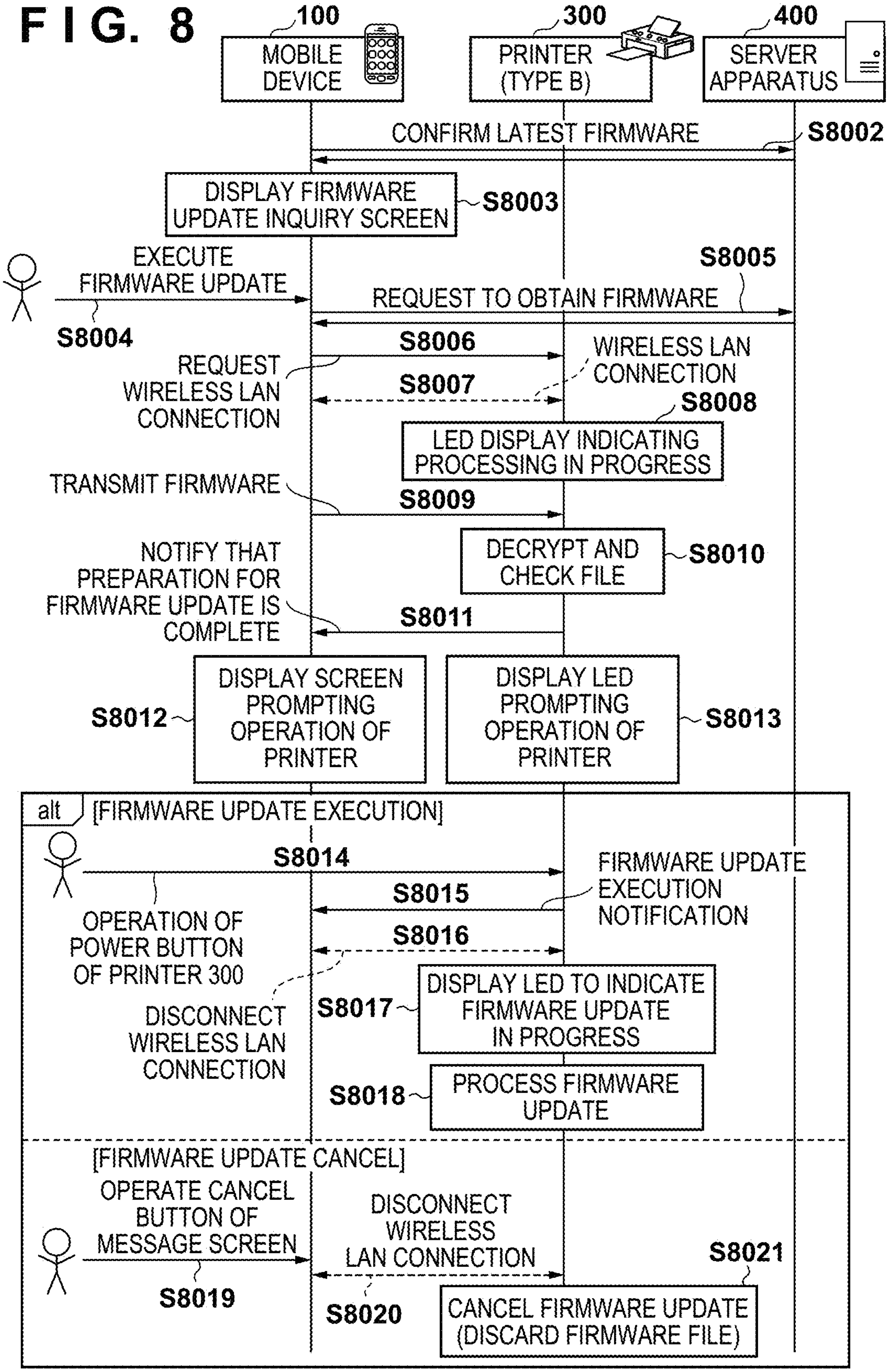
FIG. 8 is a sequence chart illustrating firmware update processing for a printer of the type B according to the embodiment.

Next, a case where the printer for which the firmware is to be updated is the type B printer 300 will be described with reference to the sequence chart in FIG. 8. FIG. 8 illustrates a sequence of operations performed after the printer 300 is selected in the printer selection screen illustrated in FIG. 5A and the mobile device 100 has confirmed the firmware version of the printer 300. It is assumed that the connection unit 311 is active in the printer 300, and the printer 300 is forming a network as a simple AP.

In FIG. 8, aside from the operations of the printer being executed by a control unit 301, steps S8002 to S8007 are the same as steps S6002 to S6007 in FIG. 6, and will therefore not be described.

In step S8008, while the printer 200 is displaying the "processing" screen in step S6008, the control unit 301 of the printer 300 causes the LED of the display unit 306 to blink slowly (FIG. 9B). Aside from the operations of the printer being executed by the control unit 301, the subsequent steps S8009 to S8011 are also the same as steps S6009 to S6011 in FIG. 6, and will therefore not be described.

Upon receiving the notification from the printer 300 that the preparation for the firmware update is complete, in step S8011, the control unit 101 does not disconnect from the printer 300.

Figure 5G:
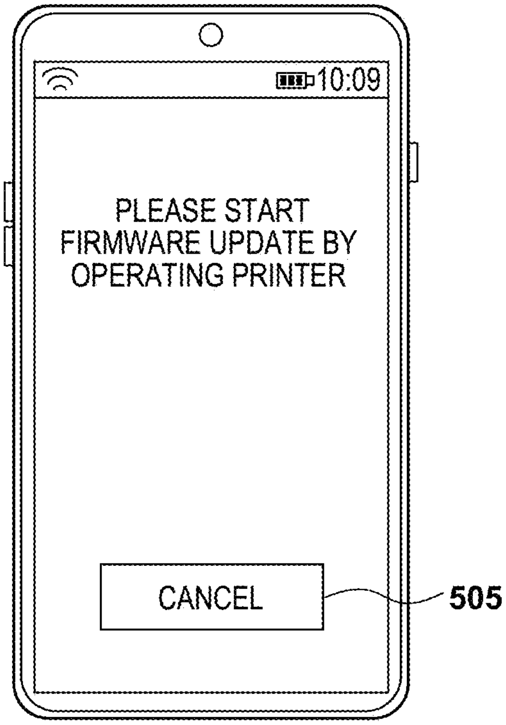

Then, in step S8012, the control unit 101 displays, in the display unit 106, a message screen prompting the user to operate the printer to execute the firmware update, as illustrated in FIG. 5G. Unlike the message screen displayed when updating the firmware of the type A printer (FIG. 5F), the message screen illustrated FIG. 5G includes a cancel button 505.

In step S8013, the control unit 301 of the printer 300 causes the display unit 306 to blink quickly (FIG. 9C), prompting the user to operate the printer 300. The operation unit 305 of the printer 300 includes only the power button 305*a*, and thus "operating the printer 300" is equivalent to "operating the power button 305*a*". Note that in the message screen displayed in the mobile device 100 in step S8012, the member to be operated and the details of the operation may be indicated more specifically, such as by displaying text reading "short-press the printer's power button to update the firmware".

When the printer has only one input device (operation member), it is difficult to instruct the firmware update to be executed or cancel the update in a selective manner in the printer. Accordingly, in the present embodiment, the printer is operated to instruct the firmware update to be executed, whereas the mobile device 100 (the print application) can be used to instruct the firmware update to be canceled.

As described above, upon receiving the notification from the printer 300 that the preparation for the firmware update is complete, in step S8011, the control unit 101 maintains the connection with the printer 300. This is to make it possible to notify the printer 300 in the event that an instruction to cancel the firmware update has been made in the mobile device 100.

On the other hand, in the case of the type A printer 200, the firmware update can be instructed to be executed and canceled by operating the printer 200. Accordingly, the mobile device 100 and the printer 200 can be disconnected after the transmission of the firmware is completed to reduce the power consumed by the mobile device 100.

In step S8014, when the user operates the power button 305*a*, the control unit 301 interprets that operation as an instruction to execute the firmware update. Note that some kind of means may be employed to ensure the operation of the power button 305*a* is not mistaken for a power-off operation. For example, after receiving the firmware file, the control unit 301 may not consider the operation of the power button 305*a* to be a power-off operation if the button is operated in a state where the mobile device 100 is still connected (the firmware update has not been canceled). Alternatively, the control unit 301 may interpret the power button 305*a* being pressed for several seconds as being a power-off operation, and the power button 305*a* being pressed quickly as being an instruction to execute the update. These are merely examples, and another method may be used instead.

In step S8015, through the connection unit 311, the control unit 301 notifies the mobile device 100 that the firmware update has started. Upon receiving the notification, in step S8016, the control unit 101 disconnects from the printer 300.

Upon detecting that the mobile device 100 has been disconnected, in step S8017, the control unit 301 causes the display unit 306 to blink slowly to indicate that the firmware is being updated (FIG. 9B). Then, in step S8018, the control unit 301 updates the firmware data stored in the non-volatile memory 303 using the latest firmware data stored in the work memory 304. Once the update processing ends, the control unit 301 restarts the printer 300.

On the other hand, in step S8019, when the user presses the cancel button 505 in the message screen displayed in the display unit 106 of the mobile device 100, in step S8020, the control unit 101 disconnects from the printer 300.

Figure 9D:
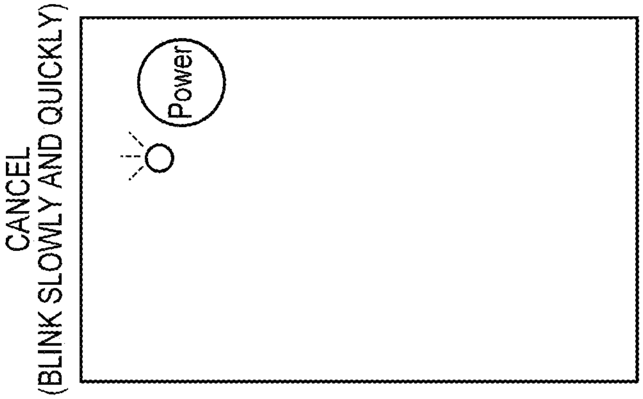

Upon detecting that the mobile device 100 has been disconnected before detecting that the power button 105*a* has been operated, the control unit 301 of the printer 300 recognizes that an instruction to cancel the firmware update processing has been made. Then, in step S8021, the control unit 301 discards the firmware file received from the mobile device 100. At this time, to indicate that the firmware update has been canceled, the control unit 301 causes the display unit 306 to blink in a unique pattern, such as alternating between blinking slowly and blinking quickly, for a set amount of time (FIG. 9D). The control unit 301 then turns the display unit 306 back on.

Note that the control unit 101 may explicitly notify the printer 300 that the firmware update processing will be canceled before disconnecting in step S8020. In this case, the printer 300 may discard the firmware file in response to the notification that the update has been canceled.

Operations of Mobile Device 100

Figure 10A:
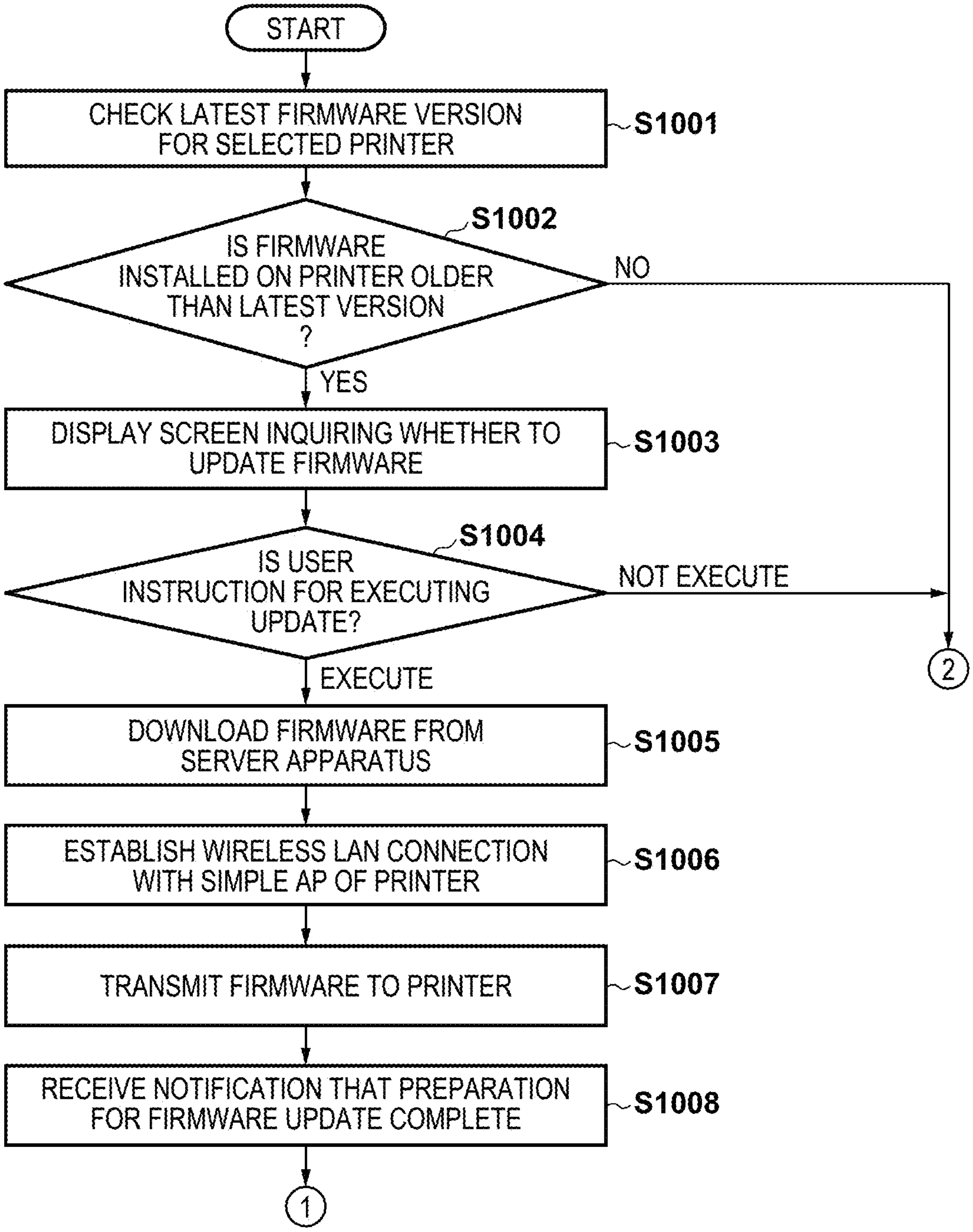
FIGS. 10A and 10B are flowcharts illustrating operations of the mobile device according to the embodiment.
Figure 10B:
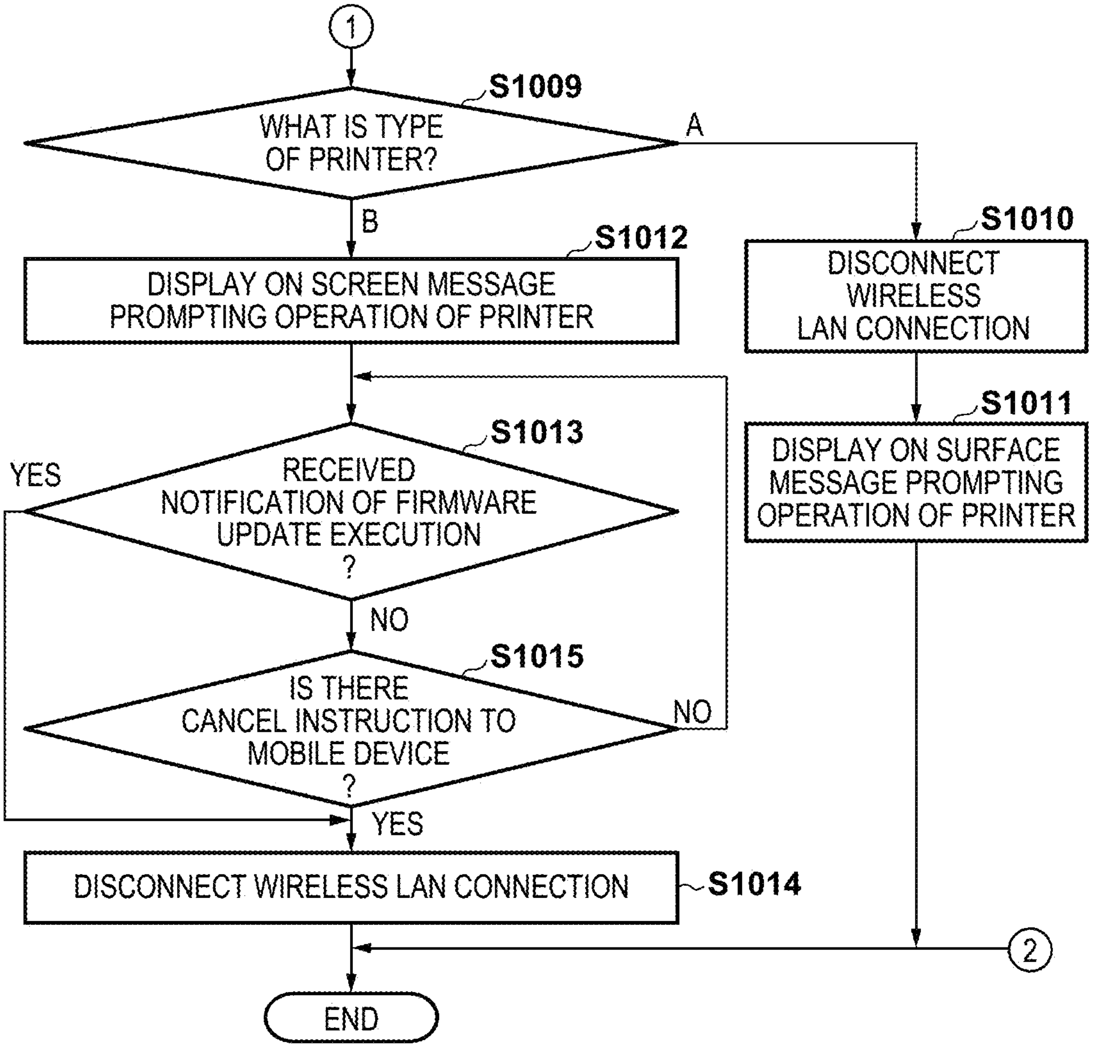

Last, operations related to the above-described processing for updating the firmware for the printers 200 and 300, performed by the mobile device 100, will be described with reference to the flowcharts in FIGS. 10A and 10B. The operations illustrated in the flowcharts of FIGS. 10A and 10B are performed by the control unit 101 of the mobile device 100 executing the print application. It is assumed here that the printers 200 and 300 have formed individual networks, to which the connection unit 111 is capable of connecting, using the connection units 211 and 311. It is also assumed that the control unit 101 is executing the print application, one of the printers 200 and 300 has been selected from the selection screen, and the version number of the installed firmware has been obtained from the selected printer and stored in the work memory 104.

In step S1001, the control unit 101 communicates with the server device 400 through the public network connection unit 113 and obtains the latest firmware version number for the selected printer.

In step S1002, the control unit 101 compares the latest version number obtained from the server device 400 with the version number stored in the work memory 104, and determines whether the firmware installed in the printer is older than the latest version. The control unit 101 executes step S1003 if the firmware installed in the printer is determined to be older than the latest version, and ends the firmware update processing if not.

In step S1003, the control unit 101 displays an inquiry screen, such as that illustrated in FIG. 5C, in the display unit 106, and stands by for a user operation. When a user operation made through the operation unit 105 is detected, the control unit 101 executes step S1004.

In step S1004, the control unit 101 determines whether the user operation is an instruction to execute the firmware update or an instruction not to execute the firmware update, executes step S1005 if the operation is determined to be an instruction to execute the firmware update, and ends the firmware update processing if the operation is an instruction not to execute the firmware update. In the example in FIG. 5C, operating the button 503 corresponds to the instruction to execute the update, and operating the button 504 corresponds to the instruction not to execute the update.

In step S1005, the control unit 101 downloads the file of the latest firmware for the printer instructed to be updated from the server device 400 through the public network connection unit 113.

In step S1006, the control unit 101 transmits a request to connect to the network formed by the printer (simple AP) to be updated through the connection unit 111. The control unit 101 then executes processing for establishing a connection with the printer, and establishes a connection with the printer.

In step S1007, the control unit 101 transmits the firmware file downloaded from the server device 400 to the printer to be updated through the connection unit 111.

In step S1008, the control unit 101 receives a notification, from the printer to be updated, that preparation for the firmware update is complete, through the connection unit 111. The control unit 101 then executes step S1009.

In step S1009, the control unit 101 determines the type of the printer to be updated. The control unit 101 executes step S1010 if the printer to be updated is determined to be type A (the printer 200), and executes step S1012 if the printer is determined to be type B (the printer 300). As described above, the control unit 101 can determine the type of the printer to be updated based on information obtained from the printer to be updated, and information, stored in the non-volatile memory 103 in advance, indicating the relationships between printers and types.

In step S1010, the control unit 101 disconnects or terminates the connection to the printer 200 through the connection unit 111.

Upon disconnecting from the printer 200, in step S1011, the control unit 101 displays, in the display unit 106, a first message screen (FIG. 5F) prompting the user to operate the printer 200 to execute the firmware update.

If the printer to be updated is a type A printer, no processing in the mobile device 100 is necessary once the transmission of the firmware file to the printer is complete.

Accordingly, the control unit 101 ends the firmware update processing upon the message screen being displayed in the display unit 106.

On the other hand, in step S1012, the control unit 101 displays, in the display unit 106, a second message screen (FIG. 5G) prompting the user to operate the printer 300 to execute the firmware update. As described above, the second message screen includes a user interface for instructing the firmware update processing to be stopped (canceled) (that is, the cancel button 505), which is not present in the first message screen.

Unlike the case where the printer to be updated is a type A printer, the control unit 101 remains connected to the printer 300 at this point in time. The control unit 101 executes step S1013 while the second message screen is displayed.

In step S1013, the control unit 101 determines whether a notification, indicating that the firmware has been updated, has been received from the printer 300 through the connection unit 111. As described above, this notification is transmitted from the printer 300 in response to an operation of the power button 305*a*, instructing the firmware update to be executed, being detected in the printer 300. The control unit 101 executes step S1014 if a notification that the firmware update has been executed is determined to have been received from the printer 300, and executes step S1015 if not.

In step S1015, the control unit 101 determines whether an instruction to stop (cancel) the firmware update processing (an operation of the cancel button 505 in the second message screen), made through the operation unit 105, has been detected. The control unit 101 executes step S1014 if an instruction to cancel the firmware update processing is determined to have been detected, and executes step S1013 if not.

In this manner, when the update target is the type B printer 300, the control unit 101 stands by while displaying the second message screen, until the firmware update is executed in the printer 300, or an instruction to cancel the firmware update processing is made. During this time, control unit 101 remains connected to the printer 300 in order to receive a notification of the firmware update being executed from the printer 300.

In step S1014, the control unit 101 disconnects or terminates the connection to the printer 300 through the connection unit 111, and ends the firmware update processing. Note that if a command instructing the printer 300 to cancel the firmware update is not transmitted, terminating the connection in step S1014 after performing step S1015 corresponds to notifying the printer 300 that the firmware update processing has been canceled.

In this manner, regardless of the number of input devices included in a device for which firmware is to be updated, the mobile device 100 according to the present embodiment handles an operation in the target device as an instruction to start the execution of the firmware update. A user interface for canceling the firmware update when the target device includes only one input device is provided in an application running on the mobile device 100.

This makes it possible to ensure the firmware update is executed after the user has definitely recognized the device for which the firmware is to be updated, regardless of the number of input devices included in that device. It is therefore possible to prevent the firmware of a device not intended by the user from being updated unintentionally.

Other Embodiments

Although the foregoing embodiment described the device for which the firmware is updated as a printer, the present invention can be similarly applied in any electronic device, capable of communicating with a mobile device, in which the same type of device has operation units with different configurations. A digital camera, a wireless earphone, a wireless keyboard, and the like can be given as examples of such an electronic device, but the electronic device is not limited thereto.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-192352, filed Nov. 10, 2023, which is hereby incorporated by reference herein in its entirety.

What is claimed is:

1. A communication apparatus comprising:

a communication interface; and one or more processors that execute a program stored in a memory and thereby function as a control unit that provides a function pertaining to firmware update of an electronic device which can be communicated with through the communication interface, wherein the control unit:

obtains information on firmware currently installed in the electronic device;

transmits latest firmware to the electronic device in a case where the installed firmware is not the latest firmware;

terminates a connection with the electronic device once the latest firmware finishes being transmitted, in a case where the electronic device is a first type of electronic device including (i) at least two independent input devices or (ii) an input device capable of providing two or more independent input regions; and maintains the connection after the latest firmware finishes being transmitted, until the firmware update of the electronic device is executed or canceled, in a case where the electronic device is a second type of electronic device including a single physical key, button, or switch as an input device.

2. The communication apparatus according to claim 1, wherein in the case where the electronic device is the second type of electronic device, the control unit provides a user interface for instructing to cancel the firmware update of the electronic device.

3. The communication apparatus according to claim 2, wherein in a case where canceling the firmware update of the electronic device is instructed through the user interface, the control unit terminates the connection as a notification that the firmware update has been canceled.

4. The communication apparatus according to claim 2, wherein the user interface is provided in a message screen prompting a user to operate the electronic device.

5. The communication apparatus according to claim 1, wherein in the case where the electronic device is the second type of electronic device, the control unit terminates the connection upon being notified, by the electronic device, that the firmware update is executed.

6. The communication apparatus according to claim 1, wherein the communication apparatus obtains the latest firmware from an external device different from the electronic device.

7. The communication apparatus according to claim 1, wherein the single physical key, button, or switch is for turning power of the electronic device on and off.

8. The communication apparatus according to claim 1, wherein the electronic device is an electronic device selected by a user from among a plurality of electronic devices registered in advance.

9. A method executed by a communication apparatus having a communication interface, the method comprising:

obtaining information on firmware currently installed in an electronic device which can be communicated with through the communication interface;

transmitting latest firmware to the electronic device in a case where the installed firmware is not the latest firmware;

terminating a connection with the electronic device once the latest firmware finishes being transmitted, in a case where the electronic device is a first type of electronic device including (i) at least two independent input devices or (ii) an input device capable of providing two independent input regions; and maintaining the connection after the latest firmware finishes being transmitted, until the firmware update of the electronic device is executed or canceled, in a case where the electronic device is a second type of electronic device including a single physical key, button, or switch as an input device.

10. A non-transitory computer-readable medium storing a program that causes, when executed by a computer comprising a communication interface, the computer to perform a method comprising:

obtaining information on firmware currently installed in an electronic device which can be communicated with through the communication interface;

transmitting latest firmware to the electronic device in a case where the installed firmware is not the latest firmware;

terminating a connection with the electronic device once the latest firmware finishes being transmitted, in a case where the electronic device is a first type of electronic device including (i) at least two independent input devices or (ii) an input device capable of providing two independent input regions; and maintaining the connection after the latest firmware finishes being transmitted, until the firmware update of the electronic device is executed or canceled, in a case where the electronic device is a second type of electronic device including a single physical key, button, or switch as an input device.

* * * * *